Patented Dec. 22, 1925.

1,566,566

UNITED STATES PATENT OFFICE.

BENJAMIN P. TAYLOR, OF WYOMING, OHIO, ASSIGNOR TO TAYLORALL, INC., OF CINCINNATI, OHIO, A CORPORATION OF OHIO.

RUBBER CEMENT.

No Drawing.   Application filed April 5, 1924.   Serial No. 704,490.

*To all whom it may concern:*

Be it known that I, BENJAMIN P. TAYLOR, a citizen of the United States, and residing at Wyoming, in the county of Hamilton and State of Ohio, have invented a new and useful Improvement in Rubber Cements, of which the following specification is a full disclosure.

My invention relates to adhesives and is particularly directed to rubber cements for securing leather, rubber, cloth, wood and other porous or fibrous substances.

One object of my invention is to provide a series of closely related rubber cements having an aqueous carrier.

Another object of my invention is to provide a series of rubber cements with extreme penetrating and adhesive powers.

Another object of my invention is to provide a series of rubber cements adapted to contain a high percentage of rubber.

Another object of my invention is to provide a series of rubber cements of which the rubber component will remain substantially stable after application.

Another object of my invention is to provide a series of rubber cements which are non-combustible and water proof.

Another object of my invention is to provide a series of rubber cements that can be made up in quantity and stored in open vessels without damaging evaporation or deterioration.

Another object of my invention is to provide a series of rubber cements which will secure adhesively, oiled leather.

Another object of my invention is to provide a series of rubber cements some of which will set only under pressure greater than the weight of the material.

Another object of my invention is to provide a series of cements containing rubber which will vulcanize at room temperatures such as from 60 to 100° F. when applied.

My invention comprises a series of correlated discoveries, as a result of which coordination I am able to produce a series of cements which will satisfy a variety of specified objects. I desire to provide such disclosures thereof as will enable anybody not only to make my specific products, but variations thereof, having properties requisite to meet a range of special and different commercial needs, in the light of this disclosure. In order to impart this working knowledge to the art, it will be advantageous to present the subject matter somewhat analytically.

1st discovery.

I have noted that aqueous rubbery liquids such as caoutchouc latex are generally very viscous and therefore when applied to fibrous materials, as cement, lie immediately on the surfaces. When the surfaces are separated long resistant fibrous threads of cement are drawn out between them.

I have discovered that furfural mixed therewith will take away the viscosity of such aqueous rubbery liquids, thus permitting them to penetrate into fibrous materials and adapting them to function as powerful binding cements. It is believed that furfural preserves the rubber and partly cures the same in addition to acting as a viscosity remover.

2nd discovery.

I have discovered that ammonia will react with furfural in the presence of rubber to produce resinous substances, which have adhesive value in joining fibrous materials. These resins harden on long standing or when exposed to light or heat. The resin in this case is known as furfuramide, which under certain conditions changes into furfurin.

These resins mix with the rubber and its aqueous carrier and produce a very superior adhesive. Moreover, ammonia is present in commercial latex as a preservative. The furfural will react with that ammonia, and the resulting compound or an excess of the furfural will act as a preservative for the rubber.

3rd discovery.

I have discovered that my adhesives and their carriers have a decided tendency to penetrate fibrous substances and that this tendency can be increased by mixing therewith special penetrants. I prefer Halowax oil, diethyl phthalate, aniline oil and nitrobenzol for reasons which will appear in the following paragraphs.

4th discovery.

I have discovered that stronger and more adaptable adhesives are produced by adding to the rubbery aqueous liquid and the furfural a chemical compound which maintains, increases or renders more effective the binding power of the rubber element in spite of conditions of usage or application which might tend to impair the same.

I have further discovered that Halowax oil, diethyl phthalate, aniline oil, and nitrobenzol have these requisite stabilizing characteristics, in addition to the penetrating qualities specified in the foregoing paragraphs. Thus I obtain from the specified use of these substances a two-fold function, which otherwise would have to be derived from the use of two separate materials, if available at all.

5th discovery.

I have discovered that Halowax oil, diethyl phthalate, aniline oil, nitrobenzol and similar substances dissolve to some extent in furfural in its rubbery environment. Furfural is soluble in water. I am therefore able to produce a homogeneous rubber-carrying liquid composed of water, furfural and any of the above-named chemical compounds.

6th discovery.

I have discovered that various materials generally used in rubber vulcanization processes will dissolve to some degree in some of the rubber vitalizers, particularly in Halowax oil. Thus I am able to produce a rubber cement which will vulcanize at room temperatures such as between 60 and 100° F. and be very lasting.

At this point I consider it best to describe more specifically the materials mentioned in the foregoing paragraphs.

Furfural is a chemical compound. Its known and relevant characteristics are: that it will react with ammonia; that it will dissolve in water; that it will dissolve numerous rubber stabilizers; that it tends to penetrate into fibrous materials and that it preserves rubber.

I desire to consider as an equivalent any chemical compound or mixture of chemical compounds having these characteristics.

By latex, I mean caoutchouc latex, i. e., any of the milky saps or juices obtained from plants and containing rubber, gutta percha, balata and similar substances. I also wish to include any synthetic latex which will have substantially the qualities and advantages of natural latex.

Halowax oil is the trade name for the mono-chlor-naphthalene, tri-chlor-naphthalene or any mixture of the same, but I wish to consider as equivalents all pertinently similar halogenated coal tar derivatives such as might be produced by conventional chemical substitutions such as bromine for chlorine and by various immaterial structural modifications of the radical.

Diethyl phthalate is a chemical compound rather than commercial name and no specific description is therefore needed.

The same is true of aniline oil and nitrobenzol.

The four above mentioned substances are aromatic derivatives. The requisite characteristics of any equivalent materials are that they will mix with the water solution of my adhesive, that they shall not readily evaporate, that they will penetrate the substances to be adhesively secured without injuring the same, and dissolve to some degree in furfural in the aqueous rubbery environment. I therefore wish to include within the scope of my patent all substances which have these characteristics and perform the same functions in substantially the same manner as the specific materials named.

The chemicals commonly employed in the vulcanization of rubber are sulphur and various accelerators well known to those skilled in the rubber art, such as zinc oxide, tetramethylthiurandisulphide, known as tuads, and hexamethylenetetramine, and these may be used in the cement.

The advantages and distinguishing characteristics of these cements are numerous.

When Halowax oil or diethyl phthalate are used, the cements are opaque, but become transparent at the optimum moment.

These cements are non-viscous and can be applied by rolls or in sign painters' pens, their penetrating powers being such that they sink into the material coated, and do not spread on the surface. Also the articles to be cemented may be dipped or sprayed.

These cements can be made in quantity and stored in open-mouthed vessels. A thin film forms over the surface and protects the remainder of the body from the action of the air. This is in contrast to the usual rubber cements which harden to the bottom when exposed to the air. Also my cements will not deteriorate as might be expected where latex is employed.

Another advantage of my cements is that I am able to get a higher percentage of rubber than in the usual rubber cements, the latter containing as a rule from one-half to five-eighths of a pound of dry rubber to the gallon. I can get good results with even less rubber, but if more rubber is desired I can increase my amount up to three pounds to a gallon.

I have also found that the penetrating powers of these cements are such that on many classes of stock the surface opposite to the one coated may be also adhesively secured. Also, these cements are effective in sticking pieces of oiled leather.

Various aniline dyes can be mixed with these cements without injury to the same for the purpose of giving the different cements distinctive and distinguishing colors. Also these products can be used as fillers for porous materials when desirable instead of as cements.

The ingredients are mixed at ordinary room temperatures such as between 60 and 80° F. The length of time of mixing depends upon the size of the batch mixed and the stirring apparatus employed. I have found it best to add each new substance sufficiently slowly to avoid undue local concentration and the stirring should be sufficient to carry and distribute each addition uniformly throughout the mass.

Some of my typical cements are as follows:

For coating of wood, leather or cloth that is intended to be shipped or used later, then brought into condition by the application of diluted cement solution or treated with benzol, carbon tetra chloride or carbon bisulphide:
 50 parts latex.
 50 parts water.
 10 parts furfural.

For folding cement, laying of channels, laying of soles or insoles or sticking socklinings or cloth to the insoles:
 52 parts caoutchouc latex.
 40 parts water.
 10 parts furfural.
 5 parts Halowax oil.

For cement requiring long lasting power, for cementing leather cover to fibre counters or for putting a leather cover on laminated pieces of leather or for joining double soles or for cementing laps of welting or belting or any place where a long lasting cement is required; or attaching rubber heels and rubber soles:
 50 parts caoutchouc latex.
 50 parts water.
 10 parts furfural.
 10 parts solution made up in the following proportion:
 30 parts Halowax oil.
 5 parts zinc oxide.
 5 parts sulphur.
 5 parts tuads.

These formulæ are merely stated as working examples and the specific components as well as the specified proportions may be varied somewhat in relation to varying requirements, readily understandable and available in the light of this disclosure.

An order of mixing the ingredients adapted readily to produce a homogeneous product is to mix the stabilizer with the furfural and then incorporate the solids such as sulphur or zinc oxide, if they are used, in this mixture. Water is then added accompanied by agitation after which the latex is slowly added thereto with further agitation. The agitation in each case is continued until a homogeneous product is obtained. This mixing operation should preferably take place at a temperature of 80° centigrade.

I desire to be limited only by the ensuing claims:

1. A new composition of matter characterized by adhesive properties the constituting components of which are rubber with an aqueous carrier and furfural constituting a body having the property of incorporating a suitable rubber stabilizer therewith, and a rubber stabilizer.

2. A new composition of matter characterized by adhesive properties the constituting components of which are rubber with an aqueous carrier, furfural, and a halogenated naphthalene.

3. A new composition of matter characterized by adhesive properties the constituting components of which are rubber with an aqueous carrier, furfural and mono-chlor-naphthalene and/or tri-chlor-naphthalene.

4. A new composition of matter characterized by adhesive properties the constituting components of which are rubber with an aqueous carrier, furfural, mono-chlor-naphthalene and/or tri-chlor-naphthalene, and sulphur.

5. A new composition of matter characterized by adhesive properties the constituting components of which are rubber with an aqueous carrier, furfural mono-chlor-naphthalene and/or tri-chlor-naphthalene, sulphur, and vulcanization accelerators.

6. A new composition of matter characterized by adhesive properties the constituting components of which are rubber with an aqueous carrier, furfural, mono-chlor-naphthalene and/or tri-chlor-naphthalene, sulphur, zinc oxide, and tuads.

7. A new composition of matter characterized by adhesive properties the constituting components of which are rubber with an aqueous carrier, ammonia, and furfural.

8. A new composition of matter characterized by adhesive properties the constituting components of which are rubber with an aqueous carrier, ammonia, and furfural constituting a body having the property of incorporating a suitable rubber stabilizer therewith, and a rubber stabilizer.

9. A new composition of matter characterized by adhesive properties the constituting components of which are rubber with an aqueous carrier, ammonia, furfural and a halogenated naphthalene.

10. A new composition of matter characterized by adhesive properties the constituting components of which are rubber with an aqueous carrier, ammonia, furfural and mono-chlor-naphthalene and/or tri-chlor-naphthalene.

11. A new composition of matter characterized by adhesive properties the constituting components of which are rubber with an aqueous carrier, ammonia, furfural, mono-chlor-naphthalene and/or tri-chlor-naphthalene, and sulphur.

12. A new composition of matter characterized by adhesive properties the constituting components of which are rubber with an aqueous carrier, ammonia, furfural, mono-chlor-naphthalene and/or tri-chlor-naphthalene, sulphur, and vulcanization accelerators.

13. A new composition of matter characterized by adhesive properties the constituting components of which are rubber with an aqueous carrier, ammonia, furfural, mono-chlor-naphthalene and/or tri-chlor-naphthalene, oil, sulphur, zinc oxide, and tuads.

14. A new composition of matter characterized by adhesive properties the constituting components of which are caoutchouc latex and furfural constituting a body having the property of incorporating a suitable rubber stabilizer therewith, and a rubber stabilizer.

15. A new composition of matter characterized by adhesive properties the constituting components of which are caoutchouc latex, furfural, and a halogenated naphthalene.

16. A new composition of matter characterized by adhesive properties the constituting components of which are caoutchouc latex, furfural and mono-chlor-naphthalene and/or tri-chlor-naphthalene.

17. A new composition of matter characterized by adhesive properties the constituting components of which are caoutchouc latex, furfural, mono-chlor-naphthalene and/or tri-chlor-naphthalene, and sulphur.

18. A new composition of matter characterized by adhesive properties the constituting components of which are caoutchouc latex, furfural, mono-chlor-naphthalene and/or tri-chlor-naphthalene, sulphur, and vulcanization accelerators.

19. A new composition of matter characterized by adhesive properties the constituting components of which are caoutchouc latex, furfural, mono-chlor-naphthalene and/or tri-chlor-naphthalene, sulphur, zinc, oxide, and tuads.

In witness whereof, I hereunto subscribe my name.

BENJAMIN P. TAYLOR.